United States Patent [19]

Shimizu et al.

[11] Patent Number: 4,961,972

[45] Date of Patent: * Oct. 9, 1990

[54] PROCESS FOR PRODUCING LINEAR MATERIAL

[75] Inventors: Goro Shimizu, Ohtsu; Masayasu Kamada, Kusatsu; Yoshimi Hayashi, Kyoto, all of Japan

[73] Assignee: Matsui Shikiso Chemical Co., Ltd., Kyoto, Japan; a part interest

[*] Notice: The portion of the term of this patent subsequent to Jan. 9, 2007 has been disclaimed.

[21] Appl. No.: 18,599

[22] Filed: Feb. 25, 1987

[30] Foreign Application Priority Data

Mar. 1, 1986 [JP] Japan .................................. 61-45114

[51] Int. Cl.$^5$ .............................................. B05D 3/02
[52] U.S. Cl. ............................ 427/388.1; 427/388.2; 427/389.8; 427/389.9; 427/434.6; 427/434.7; 427/175; 427/178; 428/913
[58] Field of Search .................. 427/178, 175, 434.7, 427/435, 388.1, 388.2, 389.8, 389.9, 430.6; 252/586; 106/22, 23; 8/64.7

[56] References Cited

U.S. PATENT DOCUMENTS

| | | | |
|---|---|---|---|
| 3,560,229 | 2/1971 | Farnham et al. | 106/21 |
| 4,028,118 | 6/1977 | Nakasuji et al. | 106/21 |
| 4,046,577 | 9/1977 | Muzyczko et al. | 430/280 |
| 4,173,677 | 11/1979 | Nakano et al. | 427/151 X |
| 4,374,670 | 2/1983 | Slocombe | 106/23 X |
| 4,421,560 | 12/1983 | Kito et al. | 106/21 |
| 4,425,161 | 1/1984 | Shibahashi et al. | 106/21 |

OTHER PUBLICATIONS

Abstract of Japanese 58/032,671 (1983) AN-8-3-33274k/14.

Primary Examiner—Thurman K. Page

[57] ABSTRACT

A process for producing a liner material characterized by dipping a core in the form of a monofilament or multifilament into a vinyl chloride resin sol composition having a thermochromic particulate material incorporated therein, the thermochromic particulate material being prepared by enclosing with the high polymer compound an electron-donating chromogenic substance, an electron-accepting substance for the chromogenic substance and a solvent having a boiling point of at least 150° C. and selected from the group consisting of alcohols, amides, esters and azomethines and further covering the resulting product with a different high polymer compound; withdrawing the core from the sol composition; and heating the core to gel the sol composition and cover the core with the gelled composition.

6 Claims, 1 Drawing Sheet

PROCESS FOR PRODUCING LINEAR MATERIAL

The present invention relates to a process for producing a linear material comprising a core covered with a thermochromic vinyl chloride resin sol composition which undergoes a reversible color change upon detecting a change in temperature with high sensitivity.

Shaped products can be prepared from vinyl chloride resin sol composition, so-called plastisol, inexpensively by relatively simple equipment. A wide variety of such products have heretofore been provided by various processes such as coating, casting, dipping and molding. Especially in the field of linear materials, electric wires or cables, yarns for preparing knitted or woven fabrics, etc. are well known which comprise a core and the sol composition covering the core.

With respect to the color, these linear materials are merely colored with usual dyes or pigments, so that it has been difficult to give them an appearance of high commercial value.

In recent years, various thermochromic substances have been developed. It is especially known that electron-donating chromogenic substances having outstanding coloring ability are useful for providing pressure-sensitive manifold papers and manifold desensitizers when employed in combination with electron-accepting substances and solvents. Furthermore, U.S. Pat. No. 3,560,229 etc. disclose that a mixture of three components, i.e. an electron-donating chromogenic substance, electron-accepting substance and solvent, undergoes a reversible color change in response to a change in the ambient temperature. The unique color-change behavior of the mixture has found wide application in coloring toys such as dolls and stuffed dolls, daily necessities or general goods such as cups and buckets, towels, shirts, garments, ornamental goods, etc.

Attention has been directed in the art to attempts to obtain linear materials which undergo a reversible color change with a change of temperature with use of such a mixture since immense industrial usefulness is expected of these materials, but a success still remains to be achieved.

This is due to the extreme difficulty encountered in maintaining the foregoing three components in a single system; one of the three components is liable to dissolve out, evaporate or otherwise release from the system. Accordingly, ink compositions or coating compositions prepared by merely mixing the three-component mixture, for example, with an adhesive are in no way useful. On the other hand, known microcapsules having the three components enclosed therein are slightly more advantageous in storage stability, whereas the encapsulated composition is not fully satisfactory in strength against the plasticizer, solvent and the like contained in vinyl chloride resin sol compositions which are used for producing linear materials. Furthermore, the encapsulated material fails to withstand heat treatment at high temperatures and to the pressure to be applied thereto during physical processes. Consequently, the microcapsules are ruptured and unable to fulfill the contemplated purpose.

In order to solve all the foregoing problems, we have conducted intensive research and accomplished the present invention with use of a thermochromic particulate material which is already disclosed by the present applicant in Japanese Patent Application SHO 56-131753 (Unexamined Japanese Patent Publication SHO 58-32671) and which comprises three components, i.e. an electron-donating chromogenic substance, an electron accepting acidic substance and a solvent capable of dissolving these substances, as enclosed with a high polymer compound and further covered with another different high polymer compound. We have found that since the particulate material has a tough film or covering, the material, when incorporated in a vinyl chloride resin sol composition (plastisol), is attacked by the plasticizer or solvent of the sol composition, has high strength against friction (pressure), retains good stability to prevent the enclosed components from oozing out and therefore does not impair the characteristics of the sol composition.

Stated more specifically, the present invention provides a process for producing a linear material characterized by dipping a core in the form of a monofilament or multifilament into a vinyl chloride resin sol composition having a thermochromic particulate material incorporated therein, the thermochromic particulate material being prepared by enclosing with a high polymer compound an electron-donating chromogenic substance, an electron-accepting substance for the chromogenic substance and a solvent having a boiling point of at least 150° C. and selected from the group consisting of alcohols, amides, esters and azomethines and further covering the resulting product with a different high polymer compound; withdrawing the core from the sol composition; and heating the core to gel the sol composition and cover the core with the gelled composition.

With the linear material of the present invention, the core covering contains the solvent as enclosed in the thermochromic particulate material. With a change of temperature, the ability of the solvent to dissolve the electron-donating chromogenic substance and the electron-accepting substance within the particulate material changes. This basically gives rise to thermochromism. At a high temperature, the solvent dissolves these two components to inhibit color formation, whereas when the temperature lowers, the dissolving ability diminishes, permitting the two components to separate out to produce a color again. With the process of the invention, therefore, the solvent fails to produce this effect unless the two components are present conjointly with the solvent. To fulfill this requirement effectively, the three components are enclosed with high polymer substances for use as a thermochromic particulate material according to the present invention.

The solvent should be at least 150° C. in boiling point because solvents having a boiling point of below 150° C. are generally soluble in water, difficult to encapsulate and too low in color change temperature. For example, butyl alcohol cause thermochromism only at temperatures of not higher than −80° C. and is therefore not actually useful in view of the color change temperature setting.

On the other hand, solvents having a boiling point of at least 150° C. are free of these drawbacks. In the case of these solvents, the color change temperature is settable over a substantially wide range of from −40°0 C. to about 200° C.

By virtue of the above action, a color change takes place repeatedly. As shown in Example 1 later, for example, a covered electric wire which is brilliant purple at temperatures of below 40° C. turns red when heated to a temperature of above 50° C.

Examples of cores useful for the present invention are filaments of copper, iron, alloys, etc., monofilaments or multifilaments of organic fibers of polyester, nylon, acrylic resin, rayon, vinylidene chloride, vinyl chloride, polypropylene, etc. and inorganic fibers of glass, ceramics, carbon, etc., and combinations of such materials and these materials as surface-treated. In view of the adhesion to the covering, multifilaments are desirable since the core of multifilament has a greatly increased area for covering and therefore exhibits enhanced strength.

With the process of the invention, the core may be colored with a dye or pigment by a known method and is not limited specifically in thickness. However, when organic fibers or inorganic fibers are used as cores for providing artificial human hair, hair for toys, garments, fishing nets, etc., the desired core thickness or fineness is about 10 to about 3000 denier. On the other hand, very thick cores are usable when electric wires, protective netting or fences and like metal conductors are to be obtained.

Of the three components of the thermochromic particulate material, the electron-donating chromogenic substance is, for example, Crylstal Violet lactone (blue), Rhodamine lactam (red), 3,3'-dimethoxyfluoran (yellow), Malachite Green lactone (green) or the like. The electron-accepting substance which reacts with the electron-donating chromogenic substance to produce a color can be selected from among a wide variety of materials including phenols, triazoles, carboxylic acids, esters, amides and metal salts of such compounds, etc. Generally, the two components are readily available as pressure- or heat-sensitive manifold agents. The remaining component, i.e. solvent, is selected from among alcohols, amides, esters and azomethines having a boiling point of at least 150° C. and including, for example, stearyl alcohol, palmityl alcohol, myristyl alcohol, lauryl alcohol, oleylamide, stearylamide, N-methyllaurylamide, acetanilide, benzamide, octyl stearate, dibutyl phthalate, benzyl benzoate, phenyl salicylate, benzylideneaniline, benzylidenestearylamine, p-methoxybenzylidene-p-anisidine, etc. These solvents are used singly or in combination.

is already stated, the color change temperature of the thermochromic particulate material to be used in the present process is dependent on the melting point or boiling point of the solvent used. Generally, those having a low melting point effect thermochromism at a lower temperature than those having a high melting point. For illustrative purposes, Table 1 shows the relation between the solvent and the color change temperature involved in the present invention.

With reference to Table 1:
(1) CVL is a pigment of the triphenylmethane type, produced by Hodogaya Chemical Co., Ltd., for blue pressure- or heat-sensitive manifold paper.
(2) PSD-HR is a pigment of the fluoran type, product of Shin-Nisso Chemical Co., Ltd., for red pressure- or heat-sensitive manifold paper.
(3) "Color change temp." is a temperature at or above which the thermochromic material becomes colorless, while at lower temperatures, the material is blue, green or red.
(4) PFT stands for phenol-formalin resin trimer.

TABLE 1

| Electron-donating chromogenic substance | Electron-accepting substance | Solvent | Color change temp. (°C.) |
|---|---|---|---|
| CVL | 5-Butylbenzotriazole | Decyl alcohol | −14 |
| CVL | 5-Butylbenzotriazole | Lauryl palmitate | 21 |
| CVL | Bisphenol A | p-Methoxybenzylidene-p-anisidine | 40 |
| CVL | 1,2,3-benzotriazole, PFT | Oleylamide | 65 |
| Malachite Green lactone | Tetrazole | Lauryl alcohol | −17 |
| Malachite Green lactone | Tetrazole | Butyl stearate | 10 |
| Malachite Green lactone | Bisphenol A | Benzylidenestearylamine | 28 |
| Malachite Green lactone | Benzotriazole-5-carboxylic acid, PFT | 3,6-Dimethoxyacetoacetanilide | 65 |
| PSD-HR | Dibenzotriazole | Myristyl alcohol | 35 |
| PSD-HR | Dibenzotriazole | Lauryl stearate | 25 |
| PSD-HR | Bisphenol A | Benzylidene-p-anisidine | 61 |
| PSD-HR | Triazoledicarboxylic acid, PFT | Oleylamide | 65 |

Examples of useful high polymer compounds for enclosing the three components first are polyester resin, polyamide resin, epoxy resin, urethane resin, silicone resin, melamine resin, urea resin, phenolic resin, etc., all of which high polymer compounds are thermosetting resins. The three components can be enclosed with one of these compounds by any of known microcapsulation processes such as the interface polymerization process, phase separation precipitation process, orifice process and in-situ process. The thermochromic material is variable in particle size as desired by varying, the mode of agitation or the amount of emulsifier or the like.

Since the thermochromic particulate material to be used in the process of the invention must be highly resistant to solvents, water, heat, etc., resistant to pressure and uniform in these properties, the particulate product obtained from the above process is further suspended in water and coated with one of the foregoing high polymer is different from the one used first, or with a hydrophilic high polymer compound such as polyvinyl alcohol, polyacrylic acid, alginic acid or gelatin, whereby thermochromic particles are obtained with the foregoing three components enclosed with a double film.

Thus, the use of at least two different high polymer compounds in combination gives the thermochromic particulate material for use in the present process tough film characteristics which can not be realized by the single use of such a compound.

Next, examples are given below for the preparation of themochromic particles.

PREPARATION EXAMLE 1

Three parts (by weight, the same as hereinafter) of 4,4-bisdimethylaminodiphenyl-o-carboxyphenylmethanelactone, 10 parts of 5-mercaptobenzotriazole, 50 parts of myristyl alcohol and 18 parts of EPIKOTE 802 (brand name for epoxy resin) were made into a solution with heating, and the solution was placed with stirring into 500 parts of 10% aqueous gelatin solution heated to 60° C. and dispersed in the form of oily droplets, 10 μm in mean particle size by stirring the mixture at an adjusted speed. Subsequently, with addition of 5 parts of EPIKURE Z (brand name for a curing agent for epoxy resin), the dispersion was continuously stirred with heating at 90° C. for 1 hour. The resulting particles were filtered off and dried, giving 72 parts of a pale blue particulate material, 10 μm in mean particle size.

The particulate material (72 parts) was then placed into 500 parts of 10% polyvinyl alcohol/styrene-maleic acid copolymer (4:1) aqueous solution with stirring, and 500 parts of 10% aqueous solution of sodium alginate was added to the mixture. Separation of the mixture into two layers was followed by gelation with 25 parts of borax, then precipitation in saturated Glauber's salt solution and thereafter decantation, affording about 200 parts of a pale blue thermochromic particulate material. The material was in the form of microcapsules having a double film of epoxy resin and polyvinyl alcohol-boric acid salt, appeared bluish purple at a temperature of below about 32° C. but became almost colorless when heated to a temperature above about 32° C. The color change was reversible repeatedly.

PREPARATION EXAMPLE 2

Two parts of Malachite Green lactone, 4 parts of bisphenol A, 20 parts of benzylidenestearylamine and 10 parts of RIGOLAC 2004MW-2 (unsaturated polyester resin, bland name) were made into a solution with stirring, and the solution was placed with stirring into 300 parts of 10% aqueous solution of gelatin heated to 80° C. and was dispersed in the form of oily droplets, 5 μm in mean particle size, by stirring the mixture at an adjusted speed. Subsequently, with addition of 0.2 part of 50% benzoyl peroxide and 0.15 part of cobalt naphthenate, the dispersion was stirred for 1 hour at an elevated temperature of 95° C. The resulting particles were filtered off and dried, giving 31 parts of a pale green particulate material, 5 μm in mean particle size.

The particulate material (31 parts) was admixed with 100 parts of 1% DEMOL N (dispersant, brand name) aqueous solution with stirring and heating to 80° C. To the mixture were added 5 parts of SUMITEX RESIN 501 (brand name, urea-melamine initial condensation product) first and then 0.2 part of SUMITEX ACCELERATOR MX (brand name for curing catalyst). The mixture was thereafter heated to 90° C., filtered and dried, giving 32 parts of a slightly green thermochromic particulate material, 5 μm in mean particle size. The material was in the form of microcapsules having a double film of unsaturated polyester resin and urea-melamine copolycondensation resin, appeared dark green at a temperature of below about 28° C. but became almost colorless when heated to a temperature above about 28° C. The color change was reversible repeatedly.

The vinyl chloride resin sol composition for use in this invention comprises the thermochromic particulate material, a plasticizer, stabilizer, auxiliary stabilizer, gelling agent and other usual additives, and a non-thermochromic pigment (which is used when required) in a combined amount of about 50 to about 130 parts per 100 parts of a vinyl chloride resin.

The vinyl chloride resin mentioned above is a vinyl chloride paste resin prepared from an emulsion of resin powder by spray-drying or otherwise drying the emulsion. The resin power may usually be vinyl chloride monomer, or a copolymer of vinyl chloride and a copolymerizable monomer such as vinyl acetate, vinyl chloride, vinyl ether, ethylene, propylene, acrylic acid ester, methacrylic acid ester, acrylic acid, methacrylic acid or acrylonitrile, obtained by emulsion polymerization or emulsion-suspension polymerization or the like. The paste resin has a vinyl content of at least 60% by weight, preferably at least 80% by weight.

Another resin which is compatible with the vinyl chloride paste resin is also usable as blended with the paste resin. Examples of such resins are methyl methacrylate resin, and copolymer resins of methyl methacrylate, such as methyl methacrylate-styrene copolymer resin, methyl methacrylate-ethyl methacrylate copolymer resin and methyl mecharylate-methyl acrylate copolymer resin.

In this case, the resin blend contains preferably at least 60% by weight of the vinyl chloride resin.

Examples of useful plasticizers are phthalate plasticizers such as dibutyl phthalate (DBP), 2-ethyl-hexyl phthalate (DOP), diisooctyl phthalate, dinonyl phthalate and ditridecyl phthalate; phosphate plasticizers such as tricresyl phosphate (TCP), trioctyl phosphate, trixylenyl phosphate, cresyldiphenyl phosphate and trischloroethyl phosphate; halogen-containing plasticizers such as chlorinated paraffin (with a chlorine content of 30 to 70% by weight), hexabromophenyl, decabromodiphenylphenyl oxide; etc. It is preferable to use a suitable mixture of such plasticizers. The phthalate plasticizer is used preferably in an amount of 5 to 100 parts, more preferably 10 to 80 parts, per 100 parts of the vinyl chloride resin. With less than 5 parts of the phthalate plasticizer present, the plastisol is low in flowability, making it difficult to obtain a linear material having a uniform covering film, whereas if the amount exceeds 100 parts, the linear material undergoes bleeding to impair the appearance. Of the phthalate plasticizers, BOD is used preferably in an amount of 4 to 15 parts per 100 parts of the vinyl chloride resin. When DBP is used in the above amount, the vinyl chloride resin sol composition gels at an increased velocity, exhibits improved adhesion to the core and has increased transparency on gelation. The phosphate plasticizer is used preferably in an amount of 4 to 60 parts per 100 parts of the vinyl chloride resin. This effects the gelation of the sol composition at a higher velocity, further affording flame retardancy and weather resistance.

The combined amount of plasticizers to be used in the process of the invention is preferably 40 to 120 parts per 100 parts of the vinyl chloride resin. If the combined amount is less than 40 parts, the linear material tends to become hard and brittle, whereas amounts exceeding 120 parts result in excessive softness and tackiness. When required, other plasticizers such as dioctyl adipate, dioctyl azelate, epoxidized soybean oil, diethylene glycol caprate, etc. are suitably usable conjointly with the above plasticizers for the present process.

Examples of stabilizers or auxiliary stabilizers useful for the vinyl chloride resin sol composition are calcium-zinc type organic agents, barium-zinc type agents, epoxy auxiliary agents, organotin mercaptide, organotin octoate, etc. These agents are used singly or in combination in an amount of 0.1 to 10 parts per 100 parts by weight of the vinyl chloride resin. Examples of gelling agents to be incorporated into the vinyl chloride resin sol composition are aluminum stearate, silica aerogel, amine-modified montmorillonite, E-CON 100 (brand name, product of Nippon Zeon), etc. These agents are used singly or in combination in an amount of 0.5 to 3 parts per 100 parts of the vinyl chloride resin.

The vinyl chloride resin sol composition for use in the process of the invention may further incorporate therein suitable kinds and amounts of thickeners, antioxidants, diluents, ultraviolet absorbers, fungicides, algicides, blowing agents, flame retardants, etc.

Examples of useful thickeners are calcium carbonate, barium sulfate, kaolin, clay, silica powder, mica, titanium white, kieselguhr, aluminum hydroxide, etc., among which calcium carbonate is desirable. These agents can be used singly or in combination in an amount of 5 to 30 parts per 100 parts of the vinyl chloride resin.

Examples of useful diluents are mineral spirit, kerosine, toluene, xylene, rubber solvent, etc. These dilents can be used singly or in combination in an amount of 2 to 20 parts per 100 parts by weight of the vinyl chloride resin.

Examples of useful ultraviolet absorbers are those of salicylic acid type such as phenyl salicylate and octylphenyl salicylate; those of triazole type such as 2(2-hydroxy-3,5-di-tert-butylphenyl)benzotriazole and 2(2-hydroxy-4-octoxyphenyl)benzotriazole; those of benzophenone type such as 2,4-dihydroxybenzophenone, 2-hydroxy-4-methoxybenzophenone and 2-hydroxy-4-methoxy-5-sulfobenzophenone; and those of cyano acrylate type such as 2-ethylhexyl-2-cyano-3,3'-diphenyl acrylate and ethyl-2-cyano-3,3'-diphenyl acrylate. These compounds are used singly or in combination in an amount of 0.5 to 2.5 parts per 100 parts of the vinyl chloride resin to afford enhanced lightfastness.

Examples of useful fungicides and algicides are 2,4,5,6-tetrachloroisophthalonitrile, 2-(4-thiazolyl)benzimidazole, N-(fluorodichloromethylthio)phthalimide, tributyltin laurate, etc. These compounds can be used singly or in admixture in an amount of 0.001 to 3.0 parts per 100 parts of the vinyl chloride resin. Examples of useful blowing agents are azodicarbonamide, p-toluenesulfonylhydrazide, dinitrosopentamethylenetetramine, etc. These compounds can be used singly or in combination in an amount of 0.5 to 10 parts per 100 parts of the vinyl chloride resin.

Examples of useful flame retardants are antimony trioxide, titanium phosphate, magnesia, aluminum hydroxide, etc., which can be used singly or in combination in an amount of 1 to 40 parts per 100 parts of the vinyl chloride resin.

According to the present invention, such additives and the thermochromic particulate material are admixed with the vinyl chloride resin to obtain a vinyl chloride resin sol composition. The amount of the thermochromic material is in no way limited specifically but is suitably determinable in order to obtain the desired color and density. However, from the viewpoint of color formation and economy, it is desirable to use 0.5 to 40 parts of the composition per 100 parts by weight of the vinyl chloride resin. Further at least two different thermochromic particulate materials are usable in a suitable combination, whereby color changes are available in at least two stages, such as purple⟷red⟷colorless, or green⟷blue⟷colorless. Furthermore, usual non-thermochromic pigments are usable in combination with the thermochromic particulate material. This enables the linear material obtained to exhibit various modes of thermochromism. For example, when both a thermochromic particulate material and a non-thermochromic pigment as coloring agents are incorporated in the vinyl chloride resin sol composition, the composition assumes the mixture of the colors of the two agents when the particulate material develops its color while exhibiting only the color of the pigment when the particulate material becomes colorless.

Furthermore, a double-covered linear material can be prepared by covering a core with a vinyl chloride resin sol composition having incorporated therein a non-thermochromic pigment only, heating the covered core for gelation, subsequently coating the covering with a vinyl chloride resin sol composition incorporating the particulate material only, and heating the coated product for gelation. The linear material then undergoes the reversible color change of: the color of the thermochromic particulate material only⟷the color of the non-thermochromic pigment only. While the non-thermochromic coloring agent to be used in not limited specifically in kind and amount, a suitable coloring agent may be selected from among pigments or dyes which are generally used. Examples of such coloring agents are Phthalocyanine Blue, Phthalocyanine Green, Hansa Yellow, Alizarine Lake, titanium oxide, Permanent Red, carbon black, quinacridone, fluorescent pigments, fluorescent dyes, etc. Such coloring agents are used singly or in combination, preferably in an amount of 0.001 to 5.0 parts per 100 parts of the vinyl chloride resin.

The vinyl chloride resin sol composition thus obtained and having the thermochromic particulate material dispersed therein generally has a viscosity of 300 to 40,000 cps (as measured by a B-type rotary viscometer at 20° C. at 12 r.p.m.), preferably 700 to 20,000 cps. If the viscosity is less than 300 cps, the composition is liable to sag and therefore encounters difficulty in forming a uniform covering or coating, whereas if it is over 40 , the composition is not applicable uniformly, similarly encountering difficulty in forming a uniform coating. Especially when the core used is a multifilament, the sol composition will not penetrate into the core smoothly. It is then likely that the linear material obtained has a structure as shown in FIG. 2 wherein the bundle of component filaments of the multifilament is merely covered with the composition, whereas it is desirable that the component filaments be dispersed in the composition as gelled. The gel covering is then likely to separate off the core when the linear material is subjected to friction or pressure.

According to the present invention, the vinyl chloride resin sol composition is applicable to the core, for example, by passing the core through a sizing nozzle for coating or by dip coating for the impregnation of the core with the composition, and the coating or covering of the composition is gelled. Since the gelation can be effected promptly, the thermochromic particulate material dispersed in the sol composition becomes dispersed in the resulting gel. The weight ratio of the core to the vinyl chloride resin sol composition is preferably 70–20 parts of the core to 30–80 parts of the sol composition. If the amount of the core is over 70 parts, it is difficult to obtain a linear material having a uniform covering and satisfactory thermochromic properties, whereas if it is less than 20 parts, the linear material obtained will not have sufficient strength.

The present invention will be described in greater detail with reference to the following examples and to the accompanying drawings, in which.

Figure 1:
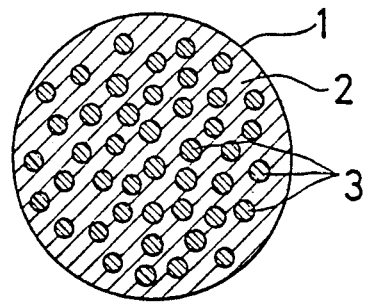
FIG. 1 is an enlarged sectional view showing a preferred linear material obtained by the process of the invention and comprising a core of multifilament.
Figure 2:
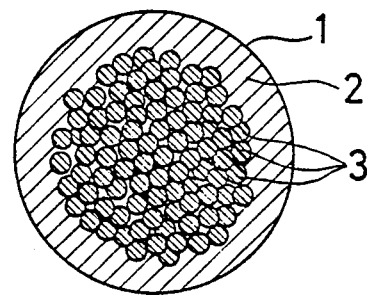
FIG. 2 is an enlarged sectional view showing a linear material comprising a core of multifilament and obtained when the vinyl chloride resin sol composition used has an excessively high viscosity.
Figure 3:
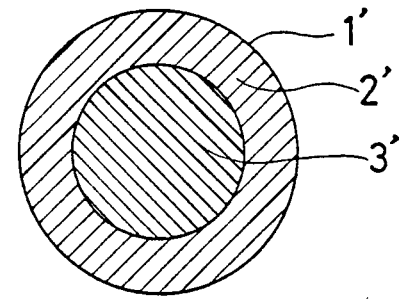
FIG. 3 is an enlarged sectional view showing another preferred linear material obtained by the present process and comprising a core of monofilament.

FIG. 1 shows a linear material 1 having a multifilament core. The component filaments 3 of the multifilament are dispersed in a gel 2 of vinyl chloride resin sol composition, and the core is uniformly covered with the gel 2 as seen in the sectional view. This structure is desirable since the covering has good adhesion to the core. FIG. 3 shows another desirable linear material 1' wherein a monofilament 3' is used as the core. The monofilament core 3' is properly covered with a gel 2' having a uniform thickness.

EXAMPLE 1

To 100 parts of ZEON 101EP (brand name for a resin for vinyl chloride paste, product of Nippon Zeon Co., Ltd.) were added in divided portions 10 parts of DOP, 50 parts of TCP, 3 parts of epoxy plasticizer, 5 parts of tribasic zinc sulfate, 5 parts of dibasic lead phosphite, 10 parts of clay and 0.5 part of high-melting paraffin, and the mixture was fully kneaded in a Banbury mixer to obtain a sol mixture To the mixture were further added in divided portions 10 parts of CHROMIC COLOR S-45 BLUE (brand name for a thermochromic particulate material, product of Matsui Shikiso Chemical Co., Ltd.) and 0-Z-7721 PINK (brand name for a toner pigment, product of Resino Color Kogyo Co., Ltd.), and the mixture was stirred to obtain a pale purple vinyl chloride resin sol composition having a viscosity of about 12,000 cps (as measured by a B-typerotary viscometer at 20° C.. at 12 r.p.m.).

Next, the sol composition was placed into the extruder of an electric wire coating apparatus to coat a bare copper wire, 1.0 mm in outside diameter, in known manner to obtain a polyvinyl chloride coated electric wire, 2.8 mm in outside diamter When usual rated current was passed through the wire, the wire appeared brilliant purple, whereas if an excessive current was passed, heat built up to change the color to pink. When the current value was then lowered, the color returned to the original purple color. The color change was reversible repeatedly. Thus, the wire had the function of detecting an abnormal current. Table 2 shows the properties of the wire determined.

EXAMPLE 2

To 100 parts of ALPHASOL LI (brand name for vinyl chloride plastisol, product of Alpha Kasei Co., Ltd.) were added in divided portions 5 parts of CHROMIC COLOR S-22 PINK (brand name for a thermochromic particulate material, product of Matsui Shikiso Chemical Co., Ltd.) and 1 part of GLOW YELLOW MF2G (brand name for a fluorescent pigment, product of Matsui Shikiso Chemical Co., Ltd.). The mixture was agitated to obtain a pale orange vinyl chloride plastisol having a viscosity of about 6,000 cps (as measured by B-type rotary viscometer at 20° C. at 12 r.p.m.).

Next, an iron wire, 0.5 mm in diameter, was immersed in the sol for coating, then passed through a nozzle, 1.2 mm in orifice size, to remove an excess of the sol and passed through an oven at 180° C. for 2 minutes to gel the coating, whereby a linear material, 1.2 mm in outside diameter was obtained. Although the wire appeared red at a temperature of not lower than about 17° C., the color changed to bright yellow when the wire was heated to a temperature above about 22° C. The color change was reversible repeatedly. Table 2 shows the properties of the linear material determined.

EXAMPLE 3

To 100 parts of P-440 (brand name for a vinyl chloride paste resin, product of Mitsubishi Monsanto Kogyo Co., Ltd.) were added in divided portions 30 parts of plasticizer DOP, 40 parts of TCP, 10 parts of DBP, 3 parts of stabilizer of the organotin laurate type and 1 part of TINUVIN 328 (brand name, a triazole ultraviolet absorber, product of Chiba-Geigy), and the mixture was fully kneaded in a planetary mixer. To the sol mixture obtained was added 10 parts of CHROMIC COLOR S-37 PINK (brand name for a thermochromic particulate material, product of Matsui Shikiso Chemical Co., Ltd.) in small portions. The mixture was thereafter stirred to obtain a pink vinyl chloride resin sol composition having a viscosity of about 6,100 cps (as measured by B-type rotary viscometer at 20° C. at 12 r.p.m.).

The sol composition was placed into a container having a nozzle with an orifice diameter of 0.3 mm, and a nylon monofilament, about 70 denier and serving as a core, was passed through the container, whereby the core was impregnated with the sol composition. The core was then passed through a nozzle with an orifice diameter of 0.3 mm to regulate the fineness and then through an oven at about 200° C. to gel the sol composition, and wound up after cooling. The linear material obtained was about 145 denier in fineness. When microscopically observed, the linear material was found to have a cross section as shown in FIG. 3. The linear material was pink at room temperature, i.e. 20° C., but immediately turned colorless when placed into warm water at 40° C. When removed from the water, the material resumed the original pink color at room temperature (20°C.). This phenomenon was reversible repeatedly. Table 2 shows the properties of the material determined.

EXAMPLE 4

A pink linear material, about 138 denier, was prepared in the same manner as in Example 3 with the exception of using an approximately 70-denier nylon multi-filament in place of the approximately 70-denier nylon monofilament. FIG. 1 shows the cross section of the linear material as observed microscopically. The material was superior to the one obtained in Example 3 in the adhesion of the covering to the core. Table 2 shows the properties of the linear material determined.

EXAMPLE 5

A blue vinyl chloride resin composition (about 5,800 cps in viscosity) was prepared in the same manner as in Example 3 except that 0.5 part of a non-thermochromic coloring agent, O-Z-7720 BLUE (brand name for a toner pigment, product of Resino Color Kogyo Co., Ltd.), was used in place of 10 parts of CHROMIC COLOR S-37 PINK. A 140-denier blue liner material was prepared in the same manner as in Example 3 using the composition. Next, using the pink sol composition prepared in Example 1, the blue linear material was treated in the same manner as in Example 1 except that the nozzle orifice diameter was 0.4 mm, whereby an approximately 265-denier pink linear material was obtained. Table 2 shows the properties of this material determined.

EXAMPLE 6

A brown vinyl chloride resin sol composition (about 6,200 cps in viscosity) was prepared by adding a non-thermochromic coloring agent, O-Z-7719 GREEN (brand name for a toner pigment, product of Resino Color Kogyo Co., Ltd.), to the sol composition obtained in Example 3. The coloring agent was used in an amount of 0.4 part per 100 parts of the vinyl chloride paste resin contained in the composition of Example 3. An approximately 4,240-denier brown linear material was prepared in the same manner as in Example 3 with the exception of using an approximately 1,280-denier nylon multifilament in place of the approximately 70-denier nylon monofilament, the above brown sol composition and a nozzle with an orifice diameter of 0.8 mm. Table 2 shows the properties of the linear material determined.

EXAMPLE 7 to 9

A dark brown vinyl chloride resin sdl composition was prepared in the same manner as in Example 3 with the exception of using 8 parts of CHROMIC COLOR S-37 GREEN, 10 parts of CHROMIC COLOR S-37 FAST BLACK and 7 parts of CHROMIC COLOR S-37 GOLD in place of 10 parts of CHROMIC COLOR S-37 PINK and further using a non-thermochromic coloring agent, 0-Z-7721 PIN, in an amount of 0.5 part. The core used was a 75-denier acrylic multifilament (Example 7), about 75-denier polyester multifilament (Example 8) or about 202-denier glass fiber multifilament (Example 9). Approximately 140-, 143- and 316-denier dark brown linear materials were prepared in Examples 7, 8 and 9, respectively, in the same manner as in Example 3 using the above composition and above-mentioned different cores. Table 2 shows the properties of these materials determined.

TABLE 2-(1)

|  | Example 1 | Example 2 | Example 3 | Example 4 |
|---|---|---|---|---|
| Core |  |  |  |  |
| Material | Copper wire monofilament | Iron wire monofilament | Nylon monofilament | Nylon multifilament |
| O.D. or fineness | 1.0 mm | 0.5 mm | 70 D | 70 D |
| Orifice size (mm) | 2.8 | 1.2 | 0.3 | 0.3 |
| Heating temperature | 180° C. | 180° C. | 200° C. | 200° C. |
| Linear material |  |  |  |  |
| cross section | FIG. 3 | FIG. 3 | FIG. 3 | FIG. 1 |
| O.D. or fineness | 2.8 mm | 1.2 mm | 145 D | 138 D |
| Core wt. (g) | 75 | 70 | 48 | 54 |
| Covering wt. (g) | 25 | 30 | 52 | 46 |
| Color change | 40° C. purple 50° C. pink | 15° C. red 25° C. yellow | 20° C. pink 40° C. colorless | 20° C. pink 40° C. colorless |
| Adhesion *3 | B | B | B | A |
| Smoothness *4 | A | A | A | A |
| Tensile strength *5 | High | High | 350 | 350 |
| Tensile elongation (%) *5 | 8 | 4 | 22 | 22 |

TABLE 2-(2)

|  | Example 5 *2 | | Example 6 | Example 7 |
|---|---|---|---|---|
|  | Inner layer | Outer layer |  |  |
| Core |  |  |  |  |
| Material | Nylon monofilament | Linear material *1 | Nylon multifilament | Acrylic multifilament |
| O.D. 93 or fineness | 70 D | 140 D | 1,200 D | 75 D |
| Orifice size (mm) | 0.3 | 0.4 | 0.8 | 0.3 |
| Heating temperature | 200° C. | 200° C. | 200° C. | 200° C. |
| Linear material |  |  |  |  |
| cross section | FIG. 3 | FIG. 3 | FIG. 1 | FIG. 1 |
| O.D. or fineness |  | 265 D | 4,240 D | 140 D |
| Core wt. (g) |  | 26 | 30 | 56 |
| Covering wt. (g) |  | 74 | 70 | 44 |
| Color change |  | 20° C. pink 40° C. blue | 20° C. dark brown 40° C. green | 20° C. brown 40° C. pink |
| Adhesion *3 |  | B | A | A |
| Smoothness *4 |  | A | A | A |
| Tensile strength *5 |  | 350 | 10,500 | 280 |
| Tensile elongation (%) *5 |  | 22 | 23 | 14 |

TABLE 2-(3)

|  | Example 8 | Example 9 |
|---|---|---|
| Core |  |  |
| Material | Polyester multifilament | Glass fiber multifilament |
| O.D. or fineness | 75 D | 202 D |
| Orifice size (mm) | 0.3 | 0.3 |

TABLE 2-(3)-continued

|  | Example 8 | Example 9 |
|---|---|---|
| Heating temperature | 200° C. | 200° C. |
| Linear material |  |  |
| cross section | FIG. 1 | FIG. 1 |
| O.D. or fineness | 143 D | 316 D |
| Core wt. (g) | 52 | 64 |
| Covering wt. (g) | 48 | 36 |
| Color change | 20° C. brown | 20° C. brown |
|  | 40° C. pink | 40° C. pink |
| Adhesion *3 | A | A |
| Smoothness *4 | A | A |
| Tensile strength *5 | 310 | 950 |
| Tensile elongation (%) *5 | 18 | 2 |

Notes:
*1, *2 The core was treated with the sol composition for the inner layer to obtain a linear material (*1), which was then treated with the sol composition for the outlayer(*2).
*3 Adhesion of the covering to the core The covering was forcibly rubbed with a knife or the nail and checked the covering for separation.
A: No separation after rubbing 50 times.
B: No separation after rubbing 20 times.
C: No separation after rubbing 10 times.
D: Separated when rubbed 10 times.
*4 Surface smoothness of the linear material Checked by the appearance and the feel.
A: Smooth.
B: Felt rough.
C: Appeared rough-surfaced.
D: Sagging.
*5 Tensile strength (g/length) and tensile elongation (%) A length (200 mm) of the linear material was used as a test piece. The test piece was pulled at a rate of 200 mm/min, and the strength (g) and elongation (mm) were measured on breaking. The tensile strength (g/length) and the tensile elongation (%) at room temperature were calculated.

EXAMPLE 10

A pink thermochromic linear material, about 60 denier, was prepared in the same manner as in Example 3 with the exception of using a nylon multifilament, 30 denier, as the core in place of the 70-denier nylon monofilament and using a nozzle with an orifice diameter of 0.15 mm. The linear material was cut to a length of 6 mm by a pile cutter to obtain short fiber for flocking. A laminate of polyurethane foam and polyester woven fabric was coated over the surface of the foam with an ink composed of 70 parts of BONCOAT ES-141 (brand name for an acrylic acid ester emulsion, product of Dainippon Ink & Chemicals Inc.), 3 parts of FIXER M-3 (brand name for a water-soluble melamine resin, product of Matsui Shikiso Chemical Co., Ltd.), 3 parts of YODOSOL KA-10 (brand name for an acrylic acid type thickener, product of Kanebo NSC Co., Ltd.) and 1 part of ammonia water, in an amount of 200 g/m² using a knife coater. The coating was then electrostatically flocked with the short fiber and then heat-treated at 120° C. for 5 minutes to obtain a thermo-chromic flocked sheet.

The flocked sheet obtained was pink at room temperature but turned colorless when heated to a temperature of over about 40° C. The color change was reversible repeatedly.

The sheet can be used for making stuffed dolls, toy animals, etc. for infants by stitching. Such a toy may be used in a bathtub to enjoy the color change.

EXAMPLE 11

A scarlet thermochromic linear material, about 40 denier, was prepared in the same manner as in Example 3 with the exception of using a 20-denier nylon multifilament core in place of the 70-denier nylon monofilament, a thermochromic particulate material, CHROMIC COLOR S-32 MAGENTA (product of Matsui Shikiso Chemical Co., Ltd.) in place of CHROMIC COLOR S-37 and a nozzle having an orifice diameter of 0.1 mm. The linear material was cut to a length of about 17 mm by a cutting machine to obtain short fiber for napping. The short fiber was woven into the meshes of a polyester knitted fabric, to which an adhesive comprising an acrylic acid ester emulsion was applied over the rear surface. After drying, the fabric was treated by a raising machine in the known manner to obtain a thermochromic napped sheet. The sheet appeared purplish red at room temperature but turned colorless when heated to a temperature of above about 35° C. The color change was reversible repeatedly.

The sheet can be used for making stuffed dolls, toy animals, etc. or clothes for dolls by stitching. Infants can enjoy the color change by touching these toys.

ADVANTAGES OF THE INVENTION (1) The liner material of the present invention basically differsfrom those having an unchangeable color heretofore known and has thermochromic properties. The present material can also be colored with a conventional coloring agent in combination with the color afforded by the invention. These features give the material a remarkably increased commercial value and enhanced usefulness.

(2) A desired color change temperature is available by using various kinds of three components in the desired combination for the thermochromic particulate material for use in the invention. The present material will find very wide application.

(3) The thermochromic particulate material for use in this invention comprises the three components of electron-donating chromogenic substance, electron-accepting substance and solvent which are enclosed with a double film. The film is therefore tough, completely protects the three components enclosed and consequently eliminates the likelihood that the thermochromic function will be impaired or lost owing to the influence of heat, pressure, solvent, etc. although this probelm was encountered with the conventional three-component micro-capsules.

4) When multifilaments are used as cores according to the invention, the covering composition penetrates into the multifilament to cover the component filaments thereof as seen in FIG. 1. The increased covering area assures a tough bond, rendering the covering less susceptible to an external influence such as friction, tension or the like.

(5) The linear materials prepared by the process of the invention are usable for spinning, twisting, kitting, weaving, union cloth, flocking, etc. as required, for a wide variety of articles and products as given below.

Industrial materials: electric wires and cables, fences, protective netting, insect netting, etc.

Garments: sweaters, shirts, blouses, mufflers, gloves, caps, wigs, shoes, etc.

Interior furnishings: curtains, carpets, mats, bedclothes. etc.

Ornaments: artificial flowers, tablecloth, lace, pennants, etc.

Toys: stuffed dolls, doll hair, clothes for dolls, emblems, etc.

What is claimed is:

1. A process for producing a linear material characterized by applying onto a core in the form of a monofilament or multifilament, a vinyl chloride resin sol composition having a thermochromic particulate material incorporated therein, the thermochromic particulate material being prepared by enclosing with (1) a high polymer compound in the form of a thermosetting resin, an electron-donating chromogenic substance, an electron-accepting substance for the chromogenic substance and a solvent having a boiling point of at least 150° C. and selected from the group consisting of alcohols, amides, esters and azomethines, and further covering the resulting product with (2) a different high polymer compound in the form of a hydrophilic high polymer compound, whereby to provide the particulate material as a double film of an inner thermosetting resin layer and an outer hydrophilic high polymer compound layer encapsulating said electron-donating chromogenic substance, said electron-accepting substance and said solvent, therewithin, and heating the core onto which said sol composition has been applied to gel the sol composition and cover the core with the gelled composition.

2. A process as defined in claim 1 wherein the ratio of the core to the vinyl chloride resin sol composition is 70 to 20 parts by weight of the core to 30 to 80 parts by weight of the sol composition, and the vinyl chloride resin sol composition comprises the thermochromic particulate material, a plasticizer, a stabilizer, an auxiliary stabilizer and a gelling agent in a combined amount of 50 to 130 parts by weight per 100 parts by weight of a vinyl chloride resin, the combined amount including 0.5 to 40 parts by weight of the thermochromic particulate material.

3. A process as defined in claim 1 wherein the core is a metal.

4. A process as defined in claim 1 wherein the core is an organic fiber.

5. A process as defined in claim 1 wherein the core is an inorganic fiber.

6. Process of claim 1 wherein said sol composition is applied by dipping the core into the sol composition, and withdrawing the core from the sol composition, and thereafter heating the core to gel the sol composition and cover the core with the gelled composition.

* * * * *